United States Patent [19]

Takashige et al.

[11] Patent Number: 4,978,484
[45] Date of Patent: Dec. 18, 1990

[54] METHOD OF AND APPARATUS FOR MANUFACTURING BIAXIALLY ORIENTED FILM

[75] Inventors: Masao Takashige; Teruyuki Iwai; Hidenobu Takeichi; Yasuo Takai; Yoshinori Sasaki; Masato Masuoka; Yuichi Ohki, all of Himeji, Japan

[73] Assignee: Idemitsu Petrochemical Co., Ltd., Tokyo, Japan

[21] Appl. No.: 331,624

[22] Filed: Mar. 30, 1989

[30] Foreign Application Priority Data

| Mar. 31, 1988 | [JP] | Japan | 63-79286 |
| Mar. 31, 1988 | [JP] | Japan | 63-79287 |
| May 30, 1988 | [JP] | Japan | 63-132365 |
| Nov. 24, 1988 | [JP] | Japan | 63-296575 |

[51] Int. Cl.$^5$ .................. B29C 47/92; B29C 55/28
[52] U.S. Cl. .................. 264/40.1; 264/40.2; 264/40.6; 264/146; 264/159; 264/178 R; 264/209.3; 264/294; 264/562; 264/564; 264/569; 425/71; 425/141; 425/143; 425/296; 425/326.1; 425/367; 425/404
[58] Field of Search .................. 264/40.1, 40.2, 40.6, 264/146, 159, 160, 178 R, 209.3, 235.8, 237, 290.2, 294, 562, 564, 566, 569; 425/71, 72.1, 135, 140, 141, 143, 296, 297, 302.1, 326.1, 367, 381, 404, 445, 466

[56] References Cited

U.S. PATENT DOCUMENTS

| 3,577,497 | 5/1971 | Matsugu et al. | 264/159 |
| 3,632,733 | 1/1972 | Yazawa | 264/564 X |
| 4,189,288 | 2/1980 | Halter | 425/72.1 |
| 4,246,212 | 1/1981 | Upmeier | 264/40.1 |
| 4,325,897 | 4/1982 | Zerle et al. | 264/564 X |
| 4,711,747 | 12/1987 | Halter | 264/40.2 |
| 4,734,245 | 3/1988 | Takashige et al. | 264/564 |

FOREIGN PATENT DOCUMENTS

| 46-15439 | 4/1971 | Japan . |
| 47-28696 | 2/1972 | Japan . |
| 52-47070 | 4/1977 | Japan . |
| 55-148118 | 11/1980 | Japan | 425/141 |

Primary Examiner—Jeffery Thurlow
Assistant Examiner—Leo B. Tentoni
Attorney, Agent, or Firm—Flynn, Thiel, Boutell & Tanis

[57] ABSTRACT

The present invention relates to a method of and an apparatus for manufacturing biaxially oriented film. A tubular original film which has been extruded by an extruding die is biaxially oriented by heat and air injected to the inside portion thereof being conveyed to nip rolls each having an individual circumferential speed. The temperature of heat to be applied to the film is controlled on the basis of the detected film thickness for the purpose of obtaining a uniform film thickness distribution. Furthermore, the film can be made uniform by adjusting the outer diameter of the bubble-shaped oriented film by adjusting the distance between two sets of nip rolls on the basis of the measured width of the film. In addition, when the thus-oriented film is subjected to a heat treatment, temperature of heat is arranged to be a predetermined temperature as to prevent adhesion of the films.

20 Claims, 7 Drawing Sheets

METHOD OF AND APPARATUS FOR MANUFACTURING BIAXIALLY ORIENTED FILM

FIELD OF THE INVENTION

The present invention relates to a method of and an apparatus for manufacturing biaxially oriented film and, more particularly, to a method of and an apparatus for manufacturing film for wrapping foods and films for wrapping a variety of industrial products.

BACKGROUND OF THE INVENTION

With a method of and an apparatus for manufacturing film of the type described above, such film is manufactured by performing a simultaneous biaxial orientation by expanding a tube-shaped film so as to make it in the form of a bubble shape by introducing a gas such as air into heated-thermoplastic resin between two sets of nip rolls each having an individual circumferential speed.

A conventional tubular method of manufacturing biaxially oriented films is schematically illustrated in FIG. 10. Referring to this figure, thermoplastic resin which has been supplied from a hopper 1 to an extruder 2 is heated and rendered molten by this extruder 2 so that the thus-molten thermoplastic resin is extruded from an annular extruding die 3. A heater for controlling the temperature of the molten resin to be extruded from the extruding die 3 is disposed on the outer surface of this extruding die 3.

A gas outlet portion 4 for introducing a gas (for example, air) into the molten tubular resin to be discharged from the extruding die 3 is provided within the extruding die 3, the gas being arranged to be supplied from a pump or the like (omitted from illustration) under a certain pressure.

When the molten tubular resin is continuously extruded from the extruding die 3 and the gas is simultaneously introduced from the gas outlet portion 4 into this tubular resin, the tubular resin is extruded in the form of a tube from the extruding die 3.

On the other hand, an air ring 5 and a cooling device 6 for supplying water whose temperature has been cooled down to a desired level are disposed at a certain interval from each other in the direction in which the tubular resin is extruded from the extruding die 3, and are also respectively maintained a predetermined distance from the extruding die 3. As a result, the thus-extruded tubular resin is cooled down by air sprayed by the air ring 5 and cooling water supplied from the cooling device 6 so that the tubular resin becomes a tubular original film $A_1$ having a predetermined thickness and an outer diameter.

The front end portion of the original film $A_1$ which has passed through the cooling device 6 is pressed by a nip roll 8 as a result of the introducing of the original film $A_1$ by means of a guide plate 7, so that air can be enclosed within the tubular original film $A_1$.

The original film $A_1$ which has passed through the nip roll 8 becomes a folded original film $A_2$, and this folded original film $A_2$ is transmitted to a nip roller 11 via guide rolls 9 and 10.

A preheater 12 is provided, if necessary, on the conveyance line through which the folded original film $A_2$ which has passed through the nip roll 11 is conveyed. In addition, an air ring 13 and a ring heater 14 are respectively provided with a predetermined interval maintained therebetween. As a result, the folded original film $A_2$ which has passed through the nip roller 11 is heated by the ring heater 14, and a desired quantity of gas is forcedly injected into the folded original film $A_2$ by an air injecting means (omitted from illustration) so that the folded original film $A_2$ is expanded to form a bubble shape.

As a result, the portion in the vicinity of the front end portion of the bubble-shaped oriented film $A_3$ is introduced into a nip roll 16 after it has passed along a flat guide roll 15 and has been given a desired hardness and an outer diameter. At this time, since the circumferential speed of the nip roll 16 is higher than that of the nip roll 11, the bubble-shaped oriented film $A_3$ is formed as a result of a simultaneous and biaxial orientation performed in association with the operation of the thus-introduced air under a pressure.

The bubble-shaped oriented film $A_3$ which has passed through the nip roll 16 is introduced into a heating furnace 18 via a conveying roll 17 in the form of a folded oriented film $A_4$ wherein it is subjected to a final heat treatment. Then, thus-treated folded oriented film $A_4$ is introduced into a conveying roll 19 so that it becomes an oriented film B. Next, this oriented film B is wound to a winding roll so as to be accommodated with the two side ends thereof having been opened by cutting.

Air to be injected from the air ring 13 is arranged to form an angle $\alpha$ with respect to the central axis of the bubble-shaped oriented film $A_3$. As a result of the thus-arranged structure, the point at which formation of the bubble-shaped oriented film $A_3$ starts is properly stabilized.

In order to provide uniform thickness of the oriented film B, the tubular original film $A_1$ and the bubble-shaped oriented film $A_3$ need to have a uniform thickness respectively. In order to achieve this, a structure is conventionally employed in which the width of a lip provided for the extruding die 3, that is the width of an outlet port through which the molten tubular resin is discharged, is arranged to be varied and this width (the degree of lip opening) is adjusted by a multiplicity of adjusting bolts.

However, a local adjustment by using the adjusting bolts can be difficult to perform since the extruding die 3 is designed to have an annular shape.

That is, if the width of a certain lip were reduced, the width of the other lip is necessarily widened. It will therefore be impossible to perform an adjustment that does not influence the overall arrangement. In other words, it involves a certain limitation in improving the thickness accuracy of the tubular original film $A_1$ by such an adjustment, and the accuracy that can be realized is within an insufficiently narrow range of $\pm 2$ to 6%.

On the other hand, since the tubular original film $A_1$ is expanded so as to be a bubble-shaped oriented film $A_3$, the fine adjustment performed with the extruding die 3 is amplified by 1.5 to 4 times and influences the thickness distribution of the bubble-shaped oriented film $A_3$. Therefore, the thickness distribution of the final product, that is, the oriented film B, is difficult to maintain uniform.

As a result, a serious problem arises when used as an industrial purpose film, such as defective appearance of a roll formed by winding the elongated biaxially oriented film, and defects generated at a secondary work such as printing, laminating and bag manufacturing.

Therefore, although the tubular biaxially orienting method exhibits an excellent advantage of a sufficient uniformity in the biaxial directions, the insufficient thickness accuracy involved therein prevents the wide use of this tubular biaxially orienting method.

In addition, since the adjustment by using the adjusting bolts can be varied depending upon the operation conditions of the overall manufacturing apparatus, working environment or the like, it needs to depend upon skilled workers. As a result, the following problems arise: apparatus automation is difficult to realize and working efficiency is insufficient.

Therefore, attempts have been made to improve the accuracy in the thickness distribution by the following techniques.

(1) A technique in which a heating cylinder is rotated in one direction or in a reciprocated manner so that the appearance of the roll is improved (see Japanese Patent Publication No. 47-28696).

(2) A technique in which the temperature of air to be sprayed through a hot air outlet port divided into sections along the circumference is adjusted on the basis of the displacement of the tube which has not as yet been oriented or which is being oriented (see Japanese Patent Publication No. 57-30369).

(3) A technique employed in a case where flat polyester films are oriented in the widthwise direction and arranged in such a manner that a heating device whose heating temperature distribution can be varied in the widthwise direction is provided in a region in which the magnification of orientation exceeds two, so that the heating temperature is raised when a portion of the film having a large width is heated (see Japanese Patent Laid-Open No. 52-47070).

However, the problem of nonuniform thickness cannot be essentially overcome by the technique (1), since the nonuniform thickness exceeds ±10% as described in an embodiment of the disclosure, although the appearance of the roll can be improved.

With the technique (2), since the structure is so arranged that hot air is used, that is, air is heated, heating in a divided manner cannot be correctly performed even if the heating air is divided into sections, certain limits being involved. In addition, as can be clearly seen from the embodiment disclosed, the structure in which a temperature difference is provided by performing a preheating before the film is oriented cannot assure the thus-provided temperature difference to be kept at the time of performing the orient.

Furthermore, with the technique (3), since the heating conditions required at the widthwise ends of the flat film are different from the heating conditions required at the central portion of the same, a satisfactorily control cannot be performed, causing the thus-performed control to become discontinued.

In order to obtain a film of uniform properties such as thickness, the shape (outer diameter) of the bubble-shaped oriented film $A_3$ must be kept constant.

There is therefore known art (see Japanese Patent Publication No. 46-15439) wherein the flat guide roll 15 of FIG. 10 is arranged to be able to be opened/closed relative to its base portion adjacent to the nip roll 16 to form a sector. The outer diameter of the bubble-shaped oriented film $A_3$ can be detected, and the flat guide roll 15 is opened/closed on the basis of the thus-detected outer diameter of the bubble-shaped oriented film $A_3$, and control is thereby so performed that the outer diameter of the bubble-shaped oriented film $A_3$ becomes constant. As a result, a rather uniform property oriented film can be obtained.

However, since the bubble-shaped oriented film $A_3$ can be moved and the shape of it is not always a true circle, in the above-described structure in which the operation of the flat guide roll 15 is controlled, the outer diameter of the bubble-shaped oriented film $A_3$ cannot be detected exactly. This leads to a result that the control of the flat guide roll 15 cannot be performed properly.

In addition, it is difficult to considerably change the inner pressure of the bubble-shaped oriented film $A_3$ only by controlling the operation of the flat guide roll 15. Therefore, the quantity of the gas to be injected under pressure and enclosed within the bubble-shaped oriented film $A_3$ must be maintained at an extremely correct level. However, the gas which has been thus injected under pressure will gradually flow out during the operation of the apparatus. This gives rise to a necessity to stop the operation of the apparatus after a certain quantity of the thus-enclosed gas has flowed out in order to start forming the bubble-shaped oriented film $A_3$ again by enclosing the gas. Therefore, a continuous stable operation cannot be performed, and an excessive amount of resin and film are lost.

Furthermore, a disadvantage is involved that when the flat guide roll 15 is moved to form a sector, the angle at which the bubble-shaped oriented film $A_3$ is flattened is changed. As a result, the manner in which the bubble-shaped oriented film $A_3$ is conveyed can be changed, causing a problem in that the film $A_3$ may be damaged.

In particular, since a controllable region of the capacities of each of the bubbles is extremely narrow in the conventional method, the formation of the bubbles by injecting air at the time of starting the orienting of the film must be performed precisely. Therefore, such operation cannot be readily performed in a large sized apparatus.

In the method of manufacturing the biaxially oriented film, a certain heat treatment is conducted for the purpose of stabilizing the dimensions of the film by fixing the orientation of the film molecules.

However, when nylon-6, which is a polyamide film, is subjected to a heat treatment nearly at 200° C. with this tubular oriented film $A_3$ folded to form a flat shape, the upper film and the lower film can be inevitably adhered to each other, and the thus-adhered two films cannot be separated from each other after the heat treatment. Therefore, the thus-adhered films will lose quality as a product. The problem of the type described above will be apparent in the case of a crystal thermoplastic resin film made of the polyamide.

In view of the foregoing, a tube method has been disclosed, for example, in which the oriented film folded to form a flat shape is subjected to a heat treatment, and an oven method has been also disclosed wherein the two sides of the oriented film are cut so as to make the oriented film two films, the thus-obtained two films are introduced into a tenter with a space held between the two films by an interposed endless belt, and the thus-introduced films are subjected to a heat treatment with the two ends of the films held by clips (see Japanese Patent Publication No. 46-15439).

In accordance with the above-described tube method, the adhesion of the two films can be prevented due to the presence of air between them. However, if a heat treatment exceeding 180° C. were applied to the film in order to obtain an excellent stability upon the dimensions of the same, the bubbles can be staggered, causing a stable heat treatment to become impossible to be performed. As an alternative, a low temperature heat treatment cannot provide a sufficiently stable dimension stability.

On the other hand, in accordance with the oven method, the following problems are involved:

(i) Since the apparatus for interposing the endless belt between the films needs to become a large scale apparatus, disadvantages in view of the working space and cost for apparatus installation arise.

(ii) The film can be easily damaged.

(iii) The mechanism for holding the two ends of the film with the endless belt interposed therebetween becomes too complicated.

(iv) If the holding mechanism were not formed strong, the film can be separated from this holding mechanism, and a continuous treatment becomes impossible to perform because the contraction stress at the time of performing the heat treatment is too large.

SUMMARY OF THE INVENTION

A first object of the present invention is to provide a method of and an apparatus for manufacturing biaxially oriented film with which films displaying an extremely uniform thickness distribution can be manufactured as the product, and adjustment and control of the thickness distribution can be automatically performed when the film is manufactured.

In order to achieve the above-described object, a method of manufacturing a biaxially oriented film is provided according to the present invention. A tubular original film obtained by rapidly cooling molten thermoplastic resin which has been extruded from an annular extruding die is simultaneously biaxially oriented by heat supplied from heating means during the conveyance of the tubular original film between two sets of nip rolls each having an individual circumferential speed, and by being formed in a shape of a bubble due to the pressure of a gas which has been injected and enclosed in the tubular original film. The method of manufacturing biaxially oriented film comprises:

detecting a thickness distribution of the original film and/or the biaxially oriented film; detecting a temperature distribution around the annular extruding die and/or a temperature distribution around the heating means which corresponds to each of the thickness distributions; changing the temperature distribution around the extruding die and/or the heating means on the basis of the relationship between each of the thickness distributions and the temperature distributions, whereby the thickness distribution of the original film and/or the biaxially oriented film is made uniform.

In order to also achieve the above-described first object, an apparatus is provided according to the present invention for manufacturing a biaxially oriented film wherein a tubular original film obtained by rapidly cooling molten thermoplastic resin which has been extruded from an annular extruding die is biaxially oriented by heat applied thereto between two sets of nip rolls and by a gas pressure injected into the inside portion thereof. The apparatus for manufacturing a biaxially oriented film comprises:

first heating means enabling a temperature distribution around the extruding die to be division-controlled and/or second heating means enabling a temperature distribution around the biaxially oriented film to be division-controlled;

means capable of detecting a thickness distribution of the original film which has been extruded from the extruding die and/or a thickness distribution of the biaxially oriented film;

temperature distribution detecting means capable of detecting a temperature distribution around the extruding die realized by the first heating means and a temperature distribution around the biaxially oriented film realized by the second heating means; and control means capable of division-controlling heating temperature around the extruding die supplied from the first heating means and heating temperature around the biaxially oriented film supplied from the second heating means on the basis of the relationship between the thus-detected thickness distribution and the temperature distribution.

A second object of the present invention is to provide a method of and an apparatus for manufacturing biaxially oriented film exhibiting an accurate width, that is, uniform orient factors, and with which an orient forming work can be readily started, and long time operation can be performed.

In order to achieve this second object, a tubular original film obtained by rapidly cooling molten thermoplastic resin which has been extruded from an annular extruding die is biaxially oriented by heat applied thereto between two sets of nip rolls and a gas pressure injected into the inside portion thereof. The method comprises:

moving one of the nip rolls so as to elongate the distance between the two sets of nip rolls if it is determined by a detection that the width of the oriented film is larger than a desired width;

moving one of the nip rolls so as to shorten the distance between the two sets of nip rolls if it is determined by detection that the width of the oriented film is smaller than a desired width, whereby the outer diameter of the oriented film is changed.

In order also to achieve the above-described second object, an apparatus is provided according to the present invention for manufacturing a biaxially oriented film wherein a tubular original film obtained by rapidly cooling molten thermoplastic resin which has been extruded from an annular extruding die is biaxially oriented by heat applied thereto between two sets of nip rolls and a gas pressure injected into the inside portion thereof. The apparatus for manufacturing a biaxially oriented film comprises:

film width detecting means capable of detecting the width of the oriented film; and moving means for adjusting the distance between the two sets of nip rolls on the basis of the results of the detection performed by the film width detecting means.

A third object of the present invention is to provide a method of an apparatus for manufacturing biaxially oriented film capable of heat setting the film, even if in a laminated state, without causing an adhesion of the film.

In order to achieve the above-described object, a method of manufacturing a biaxially oriented film according to the present invention comprises:

a process in which a tubular original film obtained by rapidly cooling molten thermoplastic resin which has been extruded from an annular extruding die is biaxially oriented by heat applied thereto between two sets of nip rolls and gas pressure injected into the inside portion thereof, and then the oriented film is folded to form a flat shape;

a first heat treatment process in which the flattened film is subjected to a heat treatment arranged at a temperature higher than a temperature at which the film starts its contraction and lower by a predetermined degree from the melting point of the film;

a process in which the two side ends of the flattened film are cut so as to be divided into two films;

a second heat treatment process in which the film is subjected to a heat treatment arranged at a temperature lower than the melting point of the film and higher than a temperature which is lower by a predetermined amount than the melting point, while holding the two ends of the films which are laminated with air interposed therebetween; and a process in which the film is wound up after the second heat treatment has been applied thereto.

In order also to achieve the above-described third object, an apparatus according to the present invention for manufacturing a biaxially oriented film comprises:

means for folding a biaxially oriented film between two sets of nip rolls to form a flat shape, the biaxially oriented film having been formed by heating a tubular original film obtained by rapidly cooling molten thermoplastic resin which has been extruded from an annular extruding die, the thus extruded tubular original film having been biaxially oriented by a gas pressure injected thereto;

first heating means for applying heat treatment to the flattened film;

trimming means for cutting two ends of the flattened film so as to divide the flattened film into two films;

means for laminating the two films with air interposed therebetween;

means for holding two ends of the thus-laminated films;

second heat treatment means for applying a heat treatment to the two films whose two ends are held; and means for winding the films which have been subjected to the heat treatment applied by the second heat treatment means.

The resins applicable to the present invention can be exemplified by: polyamide such as nylon 6, nylon 6, 6, polyolefin such as polypropylene, polyethylene terephthalate, polyvinylidene chloride, ethylene vinyl alcohol copolymer, and polystyrene. Such films may be formed by a monolayer film formed by the above-described resins, multilayered films, or a multilayered film with polyethylene, EVA, ionomer or the like.

DETAILED DESCRIPTION OF THE PREFERRED EMBODIMENT

Figure 1:
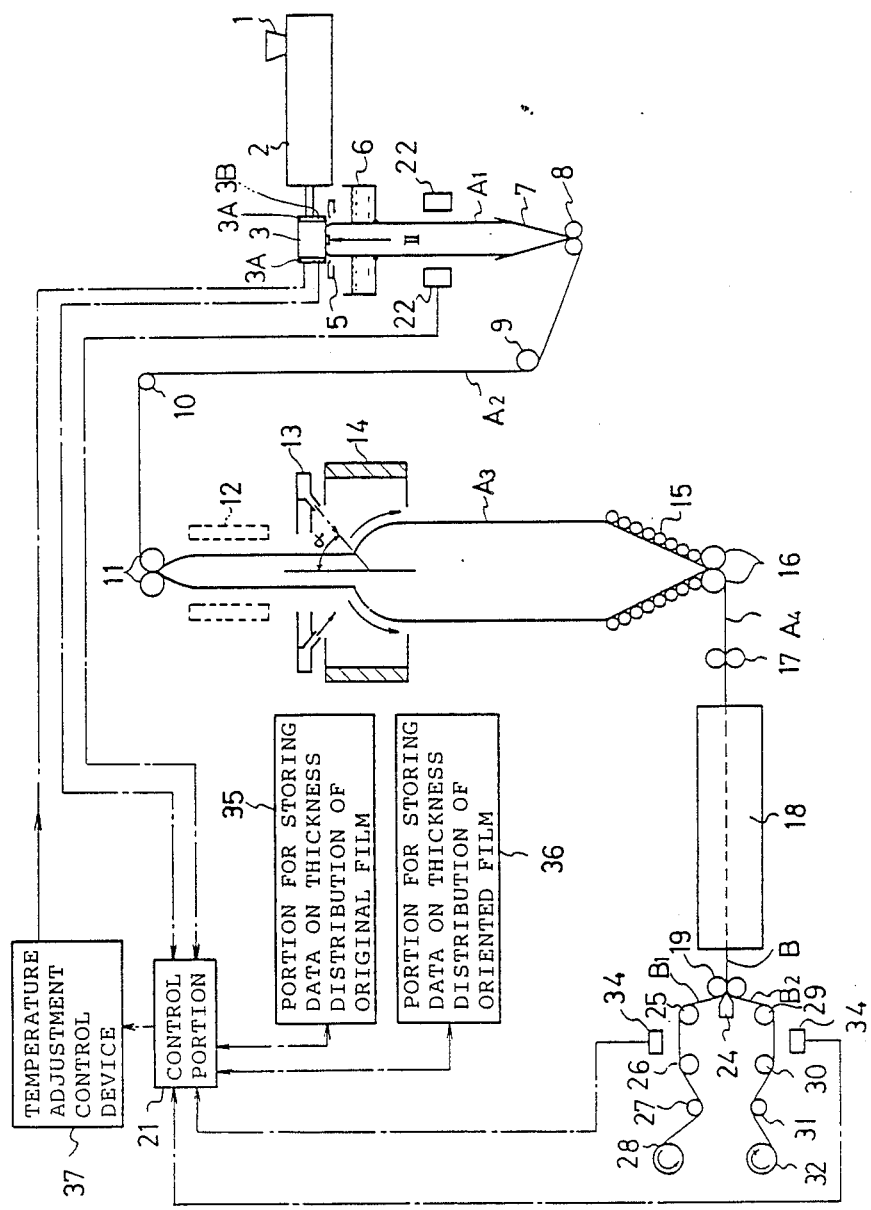
FIG. 1 is a schematic overall structural view which illustrates an embodiment of an apparatus for manufacturing biaxially oriented film according to the present invention.

An embodiment of a method of and an apparatus for manufacturing biaxially oriented film according to the present invention will now be described with reference to drawings. The same or identical portions as described in the above-described conventional apparatus are given the same reference numerals, and the descriptions of them are omitted or made briefly.

Figure 2:
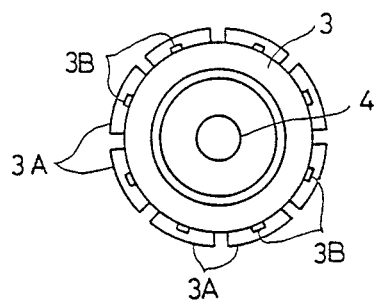
FIG. 2 is an enlarged view taken along line II of FIG. 1.

FIG. 1 is a schematic view which illustrates an apparatus for manufacturing biaxially oriented film according to the present invention (to be abbreviated to "manufacturing apparatus" hereinafter). Referring to this drawing, an annular extruding die 3 is, as will be understood from FIG. 2, provided with eight heaters 3A at the same intervals on the outer surface thereof, these eight heaters 3A forming a first heating means.

These heaters 3A are provided for the purpose of controlling the temperature of the molten resin which has been extruded from an extruder 2, these heaters 3A being capable of generating heat of individually predetermined temperature. As a result, the temperature distribution around the extruding die 3 can be varied properly.

Furthermore, the extruding die 3 is provided with temperature detectors 3B which are individually capable of detecting the temperature around the extruding die 3, that is, the temperature of the heaters 3A, these temperature detectors 3B forming a temperature distribution detecting means. The eight signals representing the detected temperatures obtained by the temperature detectors 3B are taken in by a control portion 21. As a result, the temperature distribution around the extruding die 3 can be detected.

A plurality of thickness distribution detectors 22 capable of detecting the thickness of the outer periphery of the tubular original film $A_1$ are disposed outside this tubular original film $A_1$, these thickness distribution detectors 22 forming a thickness distribution detecting means such as a radiation thickness meter using $\beta$ rays or $\gamma$ rays. The detection signals obtained from these thickness distribution detectors 22 are also arranged to be taken in by the control portion 21.

As oriented film B which has been thermoset by a heating furnace 18 forming a second heat treatment means is divided into two oriented films $B_1$ and $B_2$ by a cutter 24 after it has passed through a conveying roll 19. The thus-obtained oriented film $B_1$ is wound to a winding roll 28 after it has passed through three guide rolls 25, 26, and 27 so that it is accommodated in the winding roll 28. The oriented film $B_2$ is also wound to a winding roll 32 after it has passed through the three guide rolls 29, 30, and 31 so that it is accommodated in the winding roll 32. The division of the oriented film B into two oriented films $B_1$ and $B_2$ may be performed prior to thermosetting by the heating furnace 18.

Thickness distribution detectors 34 capable of individually detecting the widthwise thickness of the oriented films $B_1$ and $B_2$ are disposed at positions along a direction perpendicular to a conveying line for the oriented films $B_1$ and $B_2$, these thickness distribution detectors 34 forming a thickness distribution detecting means using $\beta$ rays or the like. The detection signals obtained from these thickness distribution detectors 34 are arranged to be taken in by the control portion 21.

The detection signal obtained by the thickness distribution detector 22 is stored by a portion 35 (which is a RAM or the like) for storing data on thickness distribution of the original film $A_1$ through the control portion 21. The detection signals obtained by the thickness distribution detectors 34 are stored by a portion 36 (which is a RAM or the like) for storing data on the thickness distribution of the oriented films $B_1$ and $B_2$ through the control portion 21.

The control portion 21 comprises a computing means and a temperature distribution control means, and in this control portion 21, the relationship between the thickness distribution of the original film $A_1$ and the temperature distribution around the extruding die 3 and as well the relationship between the widthwise thickness distribution of the oriented films $B_1$ and $B_2$ and the temperature distribution around the extruding die 3 are respectively computed in response to each of the taken-in detection signals.

The control portion 21 transmits, on the basis of the results of the calculations, an instruction to perform the adjustment and change of the temperature distribution around the extruding die 3 to a temperature adjustment control device 37 via the temperature distribution control means of the control portion 21.

The temperature adjustment control device 37 is capable of individually controlling the temperature around the extruding die 3, that is, the temperature of each of the heaters 3A. Since each of the heaters 3A is, as described above, provided with a function permitting the temperature thereof to be individually determined, the temperature distribution around the extruding die 3 can be determined and changed by setting different temperatures to the heaters 3A.

Then, a method of manufacturing the oriented films $B_1$ and $B_2$ by using the manufacturing apparatus according to the present invention will be described.

First, the original film $A_1$ is manufactured similarly to the conventional method. At this time, the degree of opening of the lip is adjusted by adjusting bolts (omitted from illustration) in a conventional manner, and the thickness of the original film $A_1$ is adjusted as uniform as possible.

Next, the original film $A_2$ which has been folded as a result of being pressed and deformed by the nip roll 8 is transmitted to the nip roll 11.

A bubble-shaped oriented film $A_3$ is formed by heating the folded original film $A_2$ which has passed through the nip roll 11 by the ring heater 14, by spraying air from the air ring 13 to the point at which the orienting is started and by injecting the gas under pressure and enclosing the gas in the original film $A_2$. At this time, the angle $\alpha$ at which air is sprayed with respect to the center axis of the oriented film $A_3$ is 30 to 60 degrees, preferably 45 degrees. The thus-formed bubble-shaped film $A_3$ is made of a folded oriented film $A_4$ after it has passed through the nip roll 16.

Then, the folded oriented film B obtained by applying the heat treatment to the folded oriented film $A_4$ by a heating furnace 18 is divided into two oriented films $B_1$ and $B_2$ by using the cutter 24, and thus-cut oriented films $B_1$ and $B_2$ are wound to winding rolls 28 and 32.

The control portion 21 computes the relationship between the thickness distribution of the original film $A_1$ and oriented films $B_1$ and $B_2$, and the temperature distribution around the extruding die 3, in response to the detection signals which have been transmitted from the thickness distribution detectors 22 and 34 and the detection signals representing the temperature distribution around the extruding die 3.

Then, the temperature distribution around the extruding die 3 is changed by adjusting and changing the temperature of each of the heaters 3A of the extruding die 3 via the temperature adjustment control device 37 on the basis of the results of the calculation. Furthermore, the thickness distribution of the original film $A_1$ and, in its turn, the thickness distribution of the oriented films $B_1$ and $B_2$ is made uniform by changing the viscosity of the resin. The temperature around the extruding die 3 may be controlled by, for example, adjusting the voltage.

Then, an experimental example 1 will be described.

EXPERIMENTAL EXAMPLE 1

Polyamide resin (nylon-6) having a relative viscosity of 3.7 was, as the thermoplastic resin, extruded from the extruding die 3 of a diameter of 60 mm, and was quickly cooled down by cooling water of a temperature of 40° C. supplied from the cooling device 6.

The extruding die 3 included, as described above, eight heaters 3A on the outer periphery thereof which could be individually temperature-controlled.

As a result, the original film $A_1$ was tubular, with a diameter of 80 mm and a thickness of 100$\mu$.

An infrared ray heater was employed as the ring heater 14 for forming the bubble-shaped oriented film $A_3$, air to be injected from the air ring 13 was arranged such that its angle $\alpha$ with respect to the central axis of the bubble-shaped oriented film $A_3$ was 45 degrees, a point at which the injected air strikes the bubble-shaped oriented film $A_3$ was made the point at which the bubble-shaped orientation starts, and the orienting magnification was arranged MD/TD=3.0/3.2.

As a result, whereas the accuracy of the oriented films $B_1$ and $B_2$ was $\pm 8.5\%$ in the case where the temperature distribution around the extruding die 3 had been made constant, the accuracy in this experimental example was improved to $\pm 4.0\%$.

As described above, and according to this embodiment, the thickness distribution of the original film $A_1$ is detected by the thickness distribution detector 22, while each of the widthwise thickness distributions of the oriented films $B_1$ and $B_2$ is detected by the thickness distribution detectors 34. Furthermore, the temperature of the eight heaters 3A are individually detected by the temperature detectors 3B so as to be taken into the control portion 21. As a result, the relationship between the thickness distribution and the temperature distribution around the extruding die 3 is computed in the control portion 21. Furthermore, the temperature of each of the heaters 3A is adjusted and changed, that is, individually controlled, by the temperature adjustment control device 37 to make the thickness distribution of the original film $A_1$, and the oriented films $B_1$ and $B_2$ uniform. As a result, the oriented films $B_1$ and $B_2$, that is the products, exhibit an excellent uniformity of thickness distribution.

Consequently, the appearance of a roll formed by the elongated oriented films $B_1$ and $B_2$ can be improved, and the readiness at secondary machining such as, printing on this film, coating, laminating with another film, and forming a bag, can be improved. Therefore, in addition to the obtained uniform properties, its range of applications can be significantly widened as the material used in wrapping and industrial fields.

Since the temperature distribution around the extruding die 3 is automatically controlled by the control portion 21 and the temperature adjustment control device 37, the working efficiency in manufacturing the film can be improved, and thereby the manufacturing cost can be significantly reduced.

Furthermore, the apparatus for manufacturing the biaxially oriented film can employ the conventionally installed apparatus substantially as it is. Therefore, the facility investment or the like can be achieved with a reduced cost.

In the above-described embodiment, the structure is so arranged that both the thickness distribution around the original film $A_1$ and the widthwise thickness distribution of the oriented films $B_1$ and $B_2$ are detected by the thickness distribution detectors 22 and 34. As an alternative, the structure may be so arranged that either of the thickness distributions is detected, and the temperature adjustment around the extruding die 3 is performed. Furthermore, the thickness distribution detectors 22 may be located alternatively between the nip roll 11 and the air ring 13.

Although, in the above-described embodiment, the number of the heaters 3A to be provided around the extruding die 3 is 8, it may preferably be from 4 to 20. If a Peltier device or the like were used as the heater 3A, a combined control composed of heating and cooling can be performed.

Furthermore, although the structure is arranged so that the temperature distribution around the extruding die 3 is adjusted after all of the detection signals transmitted from the thickness distribution detectors 22 and 34 have been taken in by the control portion 21, the control portion 21 may be used to control the temperature adjustment control device 37 in response to each of the detection signals transmitted from the thickness detectors 22 and 34.

In this case, the manufacturing apparatus can be simplified by arranging the structure in such a manner that the results of the calculations performed in the control portion 21 are displayed on, for example, a CRT display for the purpose of manually adjusting the temperature adjustment control device 37 in accordance with the display observed.

Figure 3:
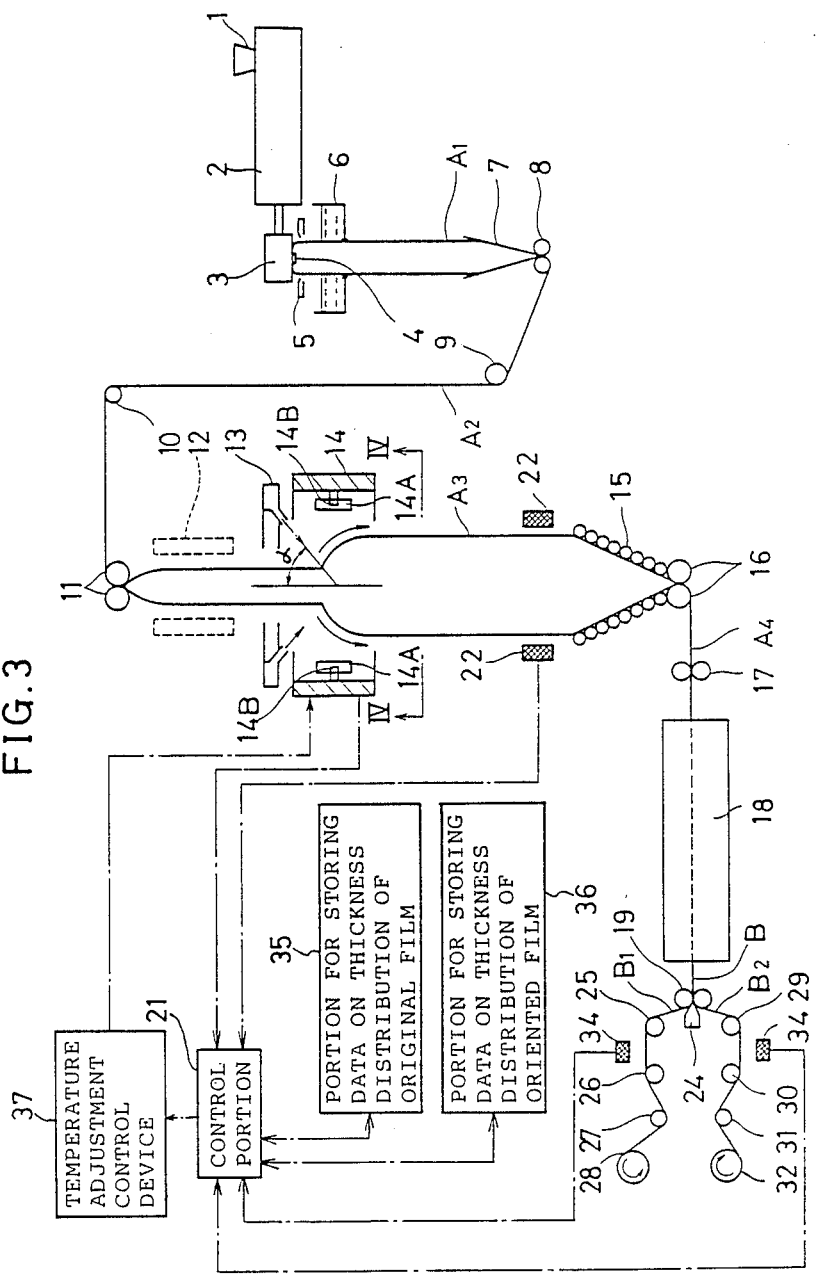
FIG. 3 is a schematic overall structural view which illustrates another embodiment.

FIG. 3 is a view which illustrates another embodiment of the present invention. This embodiment is characterized in that the heating temperature obtained by the ring heater 14 is capable of being controlled in the circumferential direction in a divided manner, and the thickness distribution detector 22 is provided in the region in which the bubble-shaped oriented film $A_3$ is conveyed.

Figure 4:
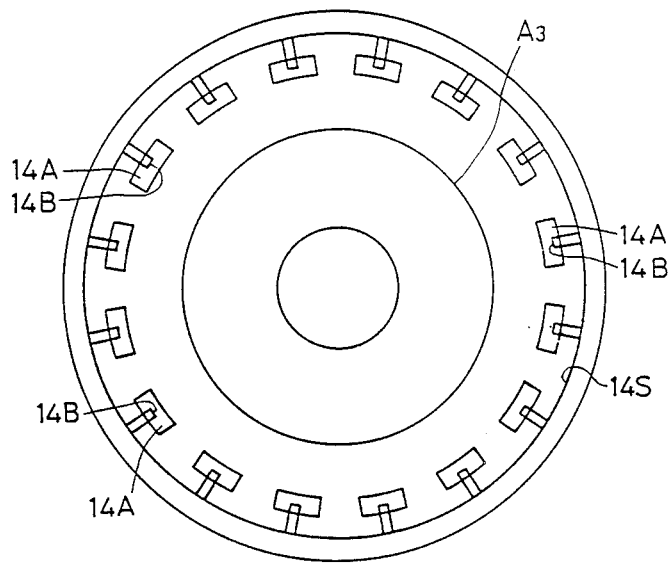
FIG. 4 is an enlarged view taken along line IV—IV of FIG. 3.

That is, as shown in FIGS. 3 and 4, a plurality of, for example, 16 infrared ray heaters 14A are disposed with a certain intervals maintained therebetween on the inner surface of a cylindrical casing 14S of the ring heater 14, this inner surface of the casing 14S being formed by a reflection surface. The infrared ray heaters 14A are each arranged to be capable of generating heat of an individual temperature. A temperature detector 14B is provided for each infrared ray heater 14A, these temperature detectors 14B forming a temperature distribution detecting means capable of detecting individual heating temperatures generated by the infrared ray heaters 14A.

As a result of the structure above, since the infrared ray heaters 14A are prevented from being heated excessively by virtue of the temperature detection, these infrared ray heaters 14A can be positioned as close as possible to the portion of the film $A_3$ which is being oriented.

Furthermore, the thickness distribution detectors 22 capable of detecting the thickness distribution in the direction along the diameter of the bubble-shaped oriented film $A_3$ are disposed in the vicinity of the position at which this bubble-shaped oriented film $A_3$ starts being introduced along the flat guide rolls 15. These thickness distribution detectors 22 are preferably disposed at a position at which the bubble-shaped film $A_3$ can be stably conveyed, that is, at a position as close to the flat guide rolls 15 as possible for the purpose of obtaining accurate measurement results. In this state, since the bubble-shaped oriented film $A_3$ is measured in the form of a cylindrical film, the thickness distribution around this cylindrical film can be simultaneously measured. In addition, since the position at which the thickness distribution is measured by the detectors 22, and the position at which the heating is performed by the infrared heater 14A are closer to each other, the output of the detected thickness distribution to be fed back to the control portion 21 includes substantially no delay. Therefore, the treatment in the control portion 21 can be quickly completed.

According to this embodiment, the relationships expressed by the following formula (1) are established between the ratio $Y_{1-n}$ (thickness accuracy of the oriented film/mean thickness of the overall body of the film) of thickness accuracy (%) of the oriented films $B_1$ and $B_2$ obtained as a result of the control performed by the control portion 21 and mean thickness of the overall body of the film, control coefficient P required for controlling, amount $X_{1-n}$ of change in temperature of the ring heater 14, thickness accuracy $Q_{1-n}$ of the oriented films $B_1$ and $B_2$ assuming that the temperature of the ring heater 14 is maintained at a constant temperature.

$$Y_{1-n} = P \cdot X_{1-n} + Q_{1-n} \qquad (1)$$

Therefore, the thickness change rate of the oriented films $B_1$ and $B_2$ corresponding to the amount of change in temperature per unit temperature for each of the portions of the ring heater 14 is obtained prior to manufacturing the film, and the temperature of the ring heater 14 to be controlled is obtained on the basis of the thickness distribution of the oriented films $B_1$ and $B_2$ so that control is performed to realize the thus-obtained temperature when the film is manufactured.

The other structure and the operation are substantially the same as those of the above-described embodiment of FIG. 1.

In addition to the effects obtained by the above-described embodiment, an additional excellent effect can be obtained since the film is heated by the ring heater 14 immediately before or during orienting the film on the basis of the film thickness distribution when the film thickness distribution is made uniform by performing the temperature different division control.

Furthermore, since the structure according to these embodiments is so formed that the infrared ray heater 14A can come closer to the bubble-shaped oriented film $A_3$ to the extent possible, a considerably excellent heat efficiency can be obtained with respect to that obtained by the system disclosed in, for example, Japanese Patent Publication No. 57-30369 in which the temperature of the hot air is controlled.

Next, experimental examples 2 and 3 carried out for the purpose of confirming the effects obtained from the above-described embodiment will be described.

EXPERIMENTAL EXAMPLE 2

In this experimental example 2, polyamide resin (nylon-6) of a relative viscosity of 3.7 serving as thermoplastic resin was extruded from the extruding die 3 having an outlet port through which molten resin was discharged and having a diameter of 60 mm. The thus-extruded molten resin was cooled down by 20° C. cooling water so that a tubular original film $A_1$ having a diameter of 80 mm and a thickness of 100μ was manufactured.

Although omitted from illustration in this experimental example 2, heaters 8 were provided around the extruding die 3 similarly to the above-described embodiment, these heaters being arranged to be individually temperature-controlled.

The simultaneous biaxial orientation was performed in such a manner that the angle $\alpha$ at which air is injected from the air ring 13 to the point at which the orienting starts was arranged to be 45 degrees, and the arranged orienting magnification was MD/TD=3.0/3.2.

Figure 5:
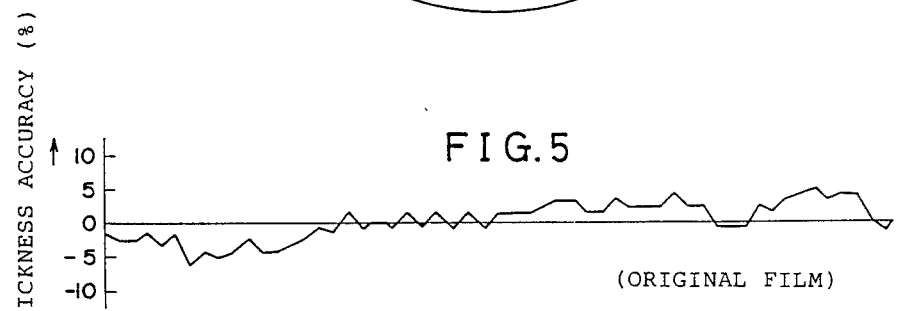
FIG. 5 is a view which illustrates characteristics of a thickness accuracy of an original film.

The thickness accuracy around the original film is shown in FIG. 5. The widthwise thickness accuracy of the oriented films $B_1$ and $B_2$, which have been oriented by the ring heater 14 of a constant temperature of 300° C. in the direction of the circumference, is designated by a curved line $L_1$ of FIG. 6.

Figure 6:
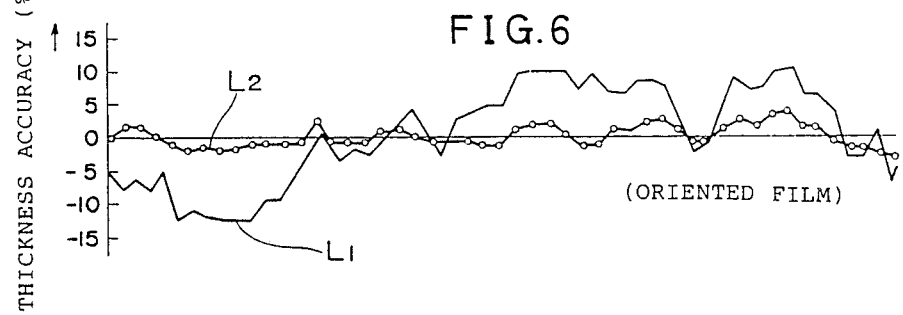
FIG. 6 is a view which illustrates characteristics of a thickness accuracy of an oriented film.

An oriented film having a thickness distribution designated by a curved line $L_2$ of FIG. 6 was obtained by performing an orientation with the temperature difference of the 16-sectioned ring heater 14 set manually within a temperature range of ±60° C. on the basis of the obtained widthwise thickness distribution of the oriented film designated by the curved line $L_1$ of FIG. 6.

As can be clearly seen from FIG. 5 and FIG. 6 which are views illustrating the characteristics, the original film involves a nonuniformity ranging from minus 7% to plus 5%. The oriented film involves a nonuniformity ranginq from minus 13% to plus 11%, as designated by the curved line $L_1$ of FIG. 6, when the ring heater 14 is not division-temperature controlled. However, the widthwise thickness accuracy was improved to the range of minus 3% to plus 4% as designated by the curved line $L_2$ of FIG. 6 when the ring heater 14 was division-temperature controlled.

EXPERIMENTAL EXAMPLE 3

This experimental example 3 was performed in a manner on the basis of the above-described experimental example 2 and the widthwise thickness distribution of the oriented film was continuously measured by the thickness distribution detectors 22 and 34, the signals representing the results of the measurements were supplied to a computing device, that is the control portion 21 of FIG. 3, and each of the detection signals from the temperature detectors 14B was also supplied to the control portion 21. The heat to be applied to the thermoplastic resin when the oriented films $B_1$ and $B_2$ were manufactured from the original film $A_1$ was computed in response to the detection signals which had been supplied to the control portion 21 by using a relational expression giving the relationship between the thickness distribution of the oriented film and the temperature distribution. The ring heater 14 was automatically division-temperature controlled with the temperature adjustment control device 37 on the basis of the result of the calculation so that the biaxial oriented film was manufactured.

The manufacturing work was continued for 12 hours, and the thickness accuracy of the biaxial oriented film during the operation was within ±4% exhibiting an excellent appearance of the roll.

If the output representing the detection obtained from the thickness distribution detectors 22 and 34 were a certain constant value, that is, if the thickness distribution of the bubble-shaped oriented film $A_3$, oriented films $B_1$ and $B_2$ were made uniform, the adjustment of the ring heater 14 is not performed, but the orienting work is continued as it is.

In the above-described embodiment, a structure may be employed in which the number of the infrared ray heaters 14A to be provided for the ring heater 14 is arranged to be 10 to 100, and a part of these infrared ray heaters 14A, that is, 10 to 60 infrared ray heaters 14A are subjected to the division-control.

Another structure may be employed in which 2 to 20 infrared heaters 14A are arranged vertically on the inner surface of the casing 14S in the direction to the axis of this casing 14S, and a part of the infrared ray heaters 14A, that is, 2 to 10 infrared ray heaters 14A are division-controlled. The necessity is that the heat to be applied around the bubble-shaped oriented film $A_3$ can be division-controlled.

A further embodiment of the method of manufacturing the biaxially oriented film according to the present invention will be described with reference to FIG. 7. The components which are the same as those described in the above-described embodiments are given the same reference numerals, and the description of the same components is omitted.

This embodiment is characterized in that the width of the folded oriented film is detected, and the distance between the two sets of the nip rolls is arranged to be adjustable on the basis of the thus-obtained results of the detection.

Figure 7:
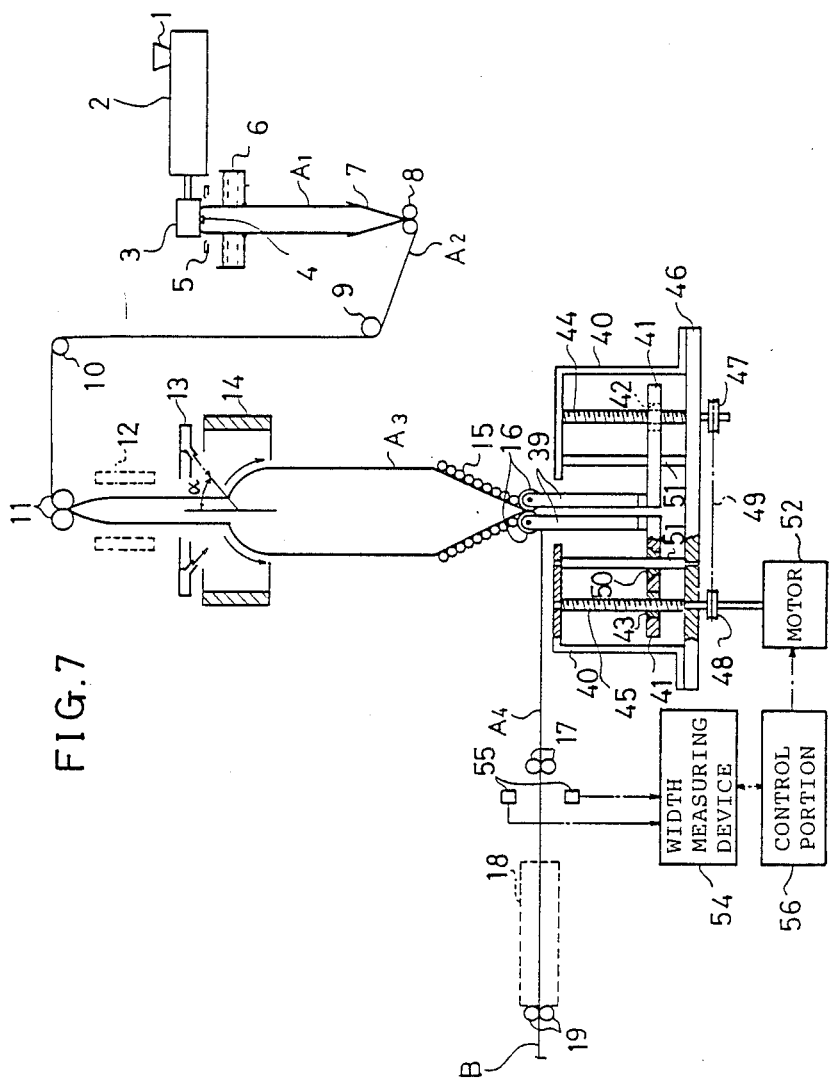
FIG. 7 is a schematic overall structural view which illustrates another embodiment of the apparatus for manufacturing biaxially oriented film according to the present invention.

Referring to FIG. 7, the nip rolls 16 are connected, with brackets 39, to ends of movable frames 41 which can reciprocate in the direction of the height of the mounting member 40, that is in the axial direction of the bubble-shaped oriented film $A_3$. Nut members 42 and 43 such as ball-nuts are provided in the movable frame 41 at two place. A feed screw shaft 44 such as a ball screw engages with the nut member 42, and a feed screw shaft 45 engages with the nut member 43.

The length of the feed screw shafts 44 and 45 is arranged to respectively project over the engaged nut members 42 and 43 and to project downward (viewed in this drawing) over a plate 46 to which the mounting member 40 is secured. Sprockets 47 and 48 are secured to the corresponding projections, and a chain 49 is arranged between the sprockets 47 and 48.

Two guide rods 51 capable of moving within bearings 50 penetrate the movable frame 41, and one end of each guide rod 51 is secured to the plate 46 while another end of the same is secured to the mounting member 40.

An end of the projecting feed screw shaft 45 is connected to a motor 52 so that the rotation of the motor 52 is transmitted to the feed screw shaft 45 via a deceleration mechanism (omitted from illustration) with which the rotational speed of the motor is decelerated to a required level. Since the other feed screw shaft 44 is rotated in synchronization with the feed screw shaft 45, the sprocket 48, chain 49, and the sprocket 47, the movable frame 41 is reciprocated along the direction of the height of the mounting member 40 while being held by the guide rod 51.

As a result, the nip rolls 16 are reciprocated in the direction of the height of the mounting member 40 with the movable frame 41, that is, in the axial direction of the bubble-shaped oriented film $A_3$.

Thus, means for moving the nip rolls 16 is formed by the feed screw shafts 44 and 45, motor 52 and so on. This moving means may be replaced by a hydraulic control structure using a booster pump or a cylinder, an air pressure control structure, or the like.

The above-described brackets 39 are capable of opening and closing in the direction in which the nip rolls 16 come closer to or away from each other so that the front end of the expanded bubble-shaped oriented film $A_3$ can be held or released. The distance between the bracket 39 illustrated and a bracket 39 (omitted from illustration) which is positioned away from this drawing sheet, that is the length of one nip roll 16, is arranged to be longer than the width of the mounting member 40 in the direction perpendicular to this drawing sheet. As a result, when the nip rolls 16 have moved in the direction in which the bubble-shaped oriented film $A_3$ is opened, the mounting member 40 is introduced into and between the two brackets 39 so that the movement of the two brackets 39 is not prevented.

A detecting portion 55 of a width measuring device 54 forming a film width detecting means for measuring the width of the folded oriented film $A_4$ is provided on the conveyance line through which the oriented film $A_4$ which has been folded by the nip rolls 16 is conveyed. As a result of this structure, an electric signal representing the width of the folded oriented film $A_4$ measured in the width measuring device 54 is taken in by a control portion 56 serving as a control means.

It is preferable for the width measuring device 54 to comprise a photoelectric cell. Alternatively, a structure may be employed wherein the detection portion 55 detects the width of the bubble-shaped oriented film, that is, the outer diameter of the same.

The control portion 56 controls the rotation of the motor 52 with a motor driving circuit (omitted from illustration) in response to the electric signal which has been transmitted thereto from the width measuring device 54. As a result, the positions of the nip rolls 16 are changed vertically in this drawing in order to make the width of the folded oriented film $A_4$ constant.

Next, a method of manufacturing the oriented film B by using the above-described manufacturing apparatus will be described.

The bubble-shaped oriented film $A_3$ which has been extruded from the extruding die 3 in a manner similar to the above-described embodiments is flattened by the nip rolls 16. The width of the thus-flattened film is measured by the detecting portion 55 of the width measuring device 54 after it has passed through feeding rolls 17. The results of the measurement are supplied to the control portion 56.

Next, the rotation of the motor 52 is controlled by the control portion 56 on the basis of the results of the measurement so that the nip rolls 16 are moved in the axial direction of the bubble-shaped oriented film $A_3$. That is, if the width of the folded oriented film $A_4$ is larger than a predetermined width, the nip rolls 16 are moved in the direction (downward in this drawing) in which the distance between the two sets of the nip rolls 16 is elongated so that the diameter of the bubble is reduced. On the other hand, if the width of the folded oriented film $A_4$ is smaller than a predetermined width, the nip rolls 16 are moved in the direction (upward in this drawing) in which the distance between the two sets of the nip rolls 16 becomes shorter so that the diameter of the bubble becomes large.

Therefore, according to this embodiment, the positions of the nip rolls 16 are moved in response to the fact that data on width of the folded oriented film $A_4$ is supplied from the width measuring device 54 to the control portion 56. As a result, the width of the folded oriented film $A_4$ is maintained at a constant width.

Furthermore, since the nip rolls 16 are capable of reciprocating, an excellent accuracy of the width of the bubble-shaped oriented film $A_3$ is not necessary when the manufacturing starts. Furthermore, the quantity of gas to be injected under pressure into the bubble-shaped oriented film $A_3$ also does not need to be a correct value because such error can be absorbed by adjusting the positions of the nip rolls 16. As a result, the gas injection work can be completed in a short time, and the time taken for the width of the film to become a stable width can be shortened so that the operation efficiency can be improved.

In addition, even if the gas overflows the bubble-shaped oriented film $A_3$ during the operation of the apparatus, the internal pressure of the bubble-shaped oriented film $A_3$ can be adjusted by moving the positions of the nip rolls 16. Therefore, a disadvantage of necessity to stop the operation and restart the work for forming the bubble-shaped oriented film $A_3$ can be overcome. As a result, a stable and extended time operation can be performed.

Furthermore, since the manufacturing apparatus according to this embodiment is automatically controlled by the control portion thereof after the operation has been started, an excellent operation efficiency can be obtained.

The mechanism to reciprocate the nip rolls 16 can be replaced by a mechanism having a motor capable of rotating in response to the operation of a predetermined lever, or a structure having manually rotatable handles attached to the feed screw shafts 44 and 45 for handling same. In this case, it is preferable to form the structure in such a manner that the results of the measurement performed by the width measuring device 54 is displayed on a CRT display and a lever or handle is rotated responsively to the display observed for the purpose of moving the nip rolls 16. Thanks to such structure, since the electric structure becomes needless in the control portion 56, the design and assembling of the apparatus can be readily completed.

Furthermore, the manufacturing apparatus may be formed in such a manner that the folded original film $A_2$ is previously manufactured, so that the first step in the apparatus according to the embodiments is the forming of the bubble-shaped oriented film $A_3$.

Figure 8:
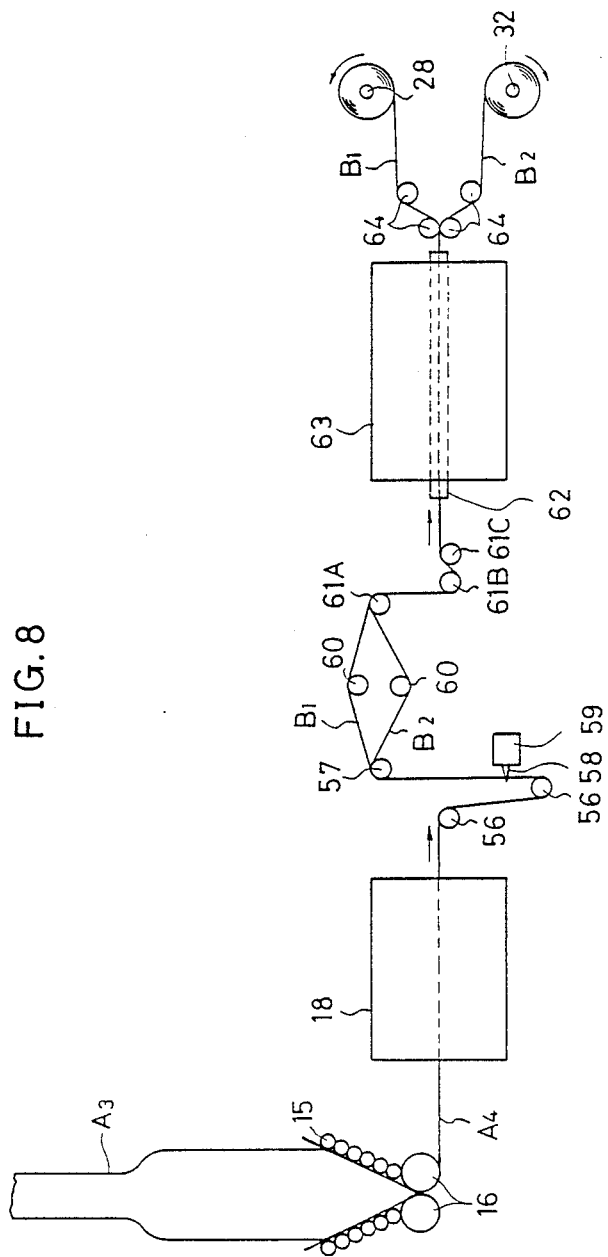
FIG. 8 is a schematic structural view which illustrates an essential portion of a heat treatment process performed in an apparatus for manufacturing biaxially oriented film according to a further embodiment of the present invention.
Figure 10:
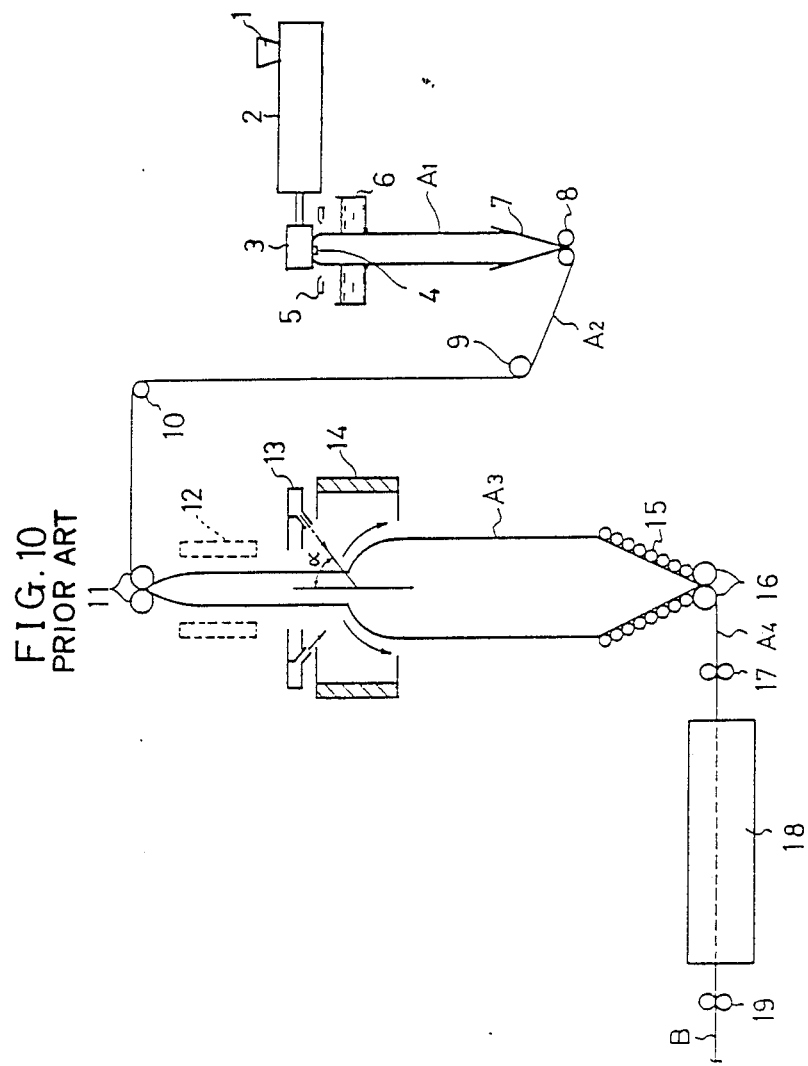
FIG. 10 is a schematic structural view which illustrates a conventional apparatus for manufacturing biaxially oriented film.

FIG. 8 is a view which illustrates an embodiment of an apparatus arranged in such a manner that the bubble-shaped oriented film $A_3$ is made the flat oriented film $A_4$ after the bubble-shaped oriented film $A_3$ has been folded, and this flat oriented film $A_4$ is subjected to the heat treatment.

Referring to this drawing, the apparatus according to this embodiment comprises: a first heating furnace 18 serving as a first heating means for having the folded oriented film $A_4$ subjected to the heat treatment, specifically a hot air furnace; and a trimming device 59 including blades 58 and serving as a trimming means for cutting two sides of the oriented film $A_4$ which has been conveyed through a plurality of guide rolls 56 for the purpose of dividing the oriented film $A_4$ into two films $B_1$ and $B_2$. This apparatus further comprises: a pair of rolls 60 positioned vertically away from each other serving as means for laminating two films $B_1$ and $B_2$ which have passed through the guide rolls 56 with air interposed between the films $B_1$ and $B_2$; three preferably groove-provided rolls 61A to 61C (see FIG. 9) positioned in this sequence in the direction in which the films $B_1$ and $B_2$ are conveyed; a tenter 62 serving as means for holding two ends of the laminated films $B_1$ and $B_2$; and a second heating furnace 63, specifically a hot air furnace serving as heat treatment means for heating the two films $B_1$ and $B_2$ whose two ends are held. The above-described groove-provided rolls 61A to 61C comprise rolls to which a plating has been applied after the groove has been formed thereon. In addition, this apparatus comprises a winding machine 28, 32 serving as winding means for winding the films $B_1$ and $B_2$ which have been subjected to the second heat treatment after they have passed through a plurality of guide rolls 64.

In the structure described above, the oriented film $A_3$ is folded to form a flat shape, and the thus-flattened film $A_4$ is initially heated in the first heating furnace 18 as the first heat treatment at a temperature that is higher than the temperature at which the contraction of the film $A_4$ starts and lower than a temperature that is lower that the melting point of the film $A_4$ by 30° C. As a result of the thus-formed structure, the crystallinity of the film $A_4$ can be increased, causing the smoothness of sliding the folded films to be improved. Then, the two sides of the thus-folded film $A_4$ are cut by the blades 58 of the trimming device 59 so that the film $A_4$ is divided into two films $B_1$ and $B_2$. The film $A_4$ may be cut in such a manner that a marginal edge portion is created as a result of inward positioning of the blade 58 by a slight distance from the two ends, or no marginal edge is created as a result of positioning the blade 58 elsewhere relative to the film $A_4$. Next, air is brought into contact with the inner surface of each of the films $B_1$ and $B_2$ by conveying the films $B_1$ and $B_2$ above and below the corresponding rolls 60 with the two films $B_1$ and $B_2$ separated from each other.

Figure 9:
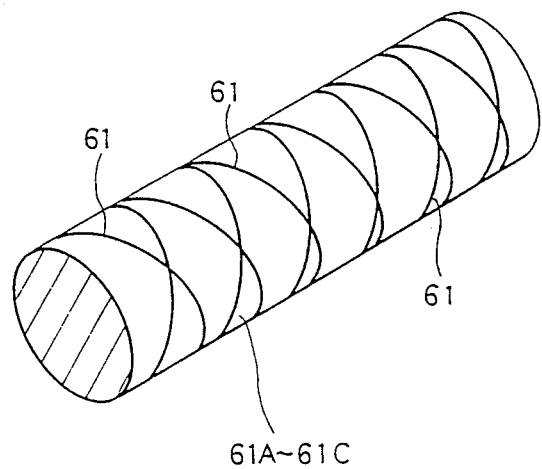
FIG. 9 is a perspective view which illustrates a roll provided with a groove used in the apparatus of FIG. 8.

Next, as shown in FIG. 9, the films $B_1$ and $B_2$ successively pass through the three rolls 61A to 61C, each having a groove 61. As a result, the two films $B_1$ and $B_2$ are laminated on each other with air interposed therebetween. As a result of the provision of the groove-provided rolls 61A to 61C, a satisfactory contact between the films $B_1$ and $B_2$ and air can be established by virtue of the groove 61. Next, the thus-laminated films $B_1$ and $B_2$ are conveyed to the second heating furnace 63 wherein the two films $B_1$ and $B_2$ are subjected to the second heat treatment arranged at a temperature below the melting point of the film and higher than a temperature which is lower by 30° C. The films $B_1$ and $B_2$ applied with the heat treatment are lastly wound to the winding machine 28, 32 after they have passed through the guide rolls 64.

Then, experimental examples and comparative examples of the heat treatment with the above-described heat treatment performed in such a manner that the treatment conditions were varied will be described.

EXPERIMENTAL EXAMPLE 4

Polyamide nylon-6 of a relative viscosity of 3.7 serving as the crystalline thermoplastic resin was employed, and this polyamide nylon-6 was extruded through an annular die of a diameter of 60 mm. Then it was quickly cooled down by 15° C. cooling water so that a tubular nylon film (whose temperature at which contraction starts was 45° C., and melting point was 215°) of a diameter of 90 mm and thickness of 120 $\mu$ was manufactured. The thus-manufactured original film is heated by the infrared ray heater at the position between a pair of nip rolls so that simultaneous and biaxial orientation was performed at an orienting magnification MD/TD=3.0/3.2.

Next, this nylon film was successively supplied to the guide rolls 15 and the pinch rolls 16 to be folded. Consequently flat tubular nylon film was obtained.

Then, the thus-obtained flat nylon film was introduced into the first hot air type heating furnace 18 (clip system) wherein the nylon film was subjected to a first heat treatment at 60° for 5 seconds, thus the nylon film was initially thermally set.

Next, the flat nylon film was cut by the trimming device 59 so as to be divided into two nylon films. Then, the thus-divided nylon films were separated from each other by the rolls 60, and the inner surface of each of the films was brought into contact with air. Next, the nylon films were laminated again by being passed through rolls with no groove (omitted from illustration).

Then, these nylon films were subjected to a second heat treatment at 210° for 10 seconds in the second hot air type heating furnace 63 with the two ends thereof held by the tenter 62 for the purpose of thermally setting these nylon films.

Next, the thus-thermally set nylon films were wound to the winding machine 28, 32.

The nylon films obtained as a result of the above-described heat treatment did not show any adhesion of the films so that they were able to be divided into two sheets. The contraction ratio in 115° C. water was MD/TD -4.0/4.0 (%), and a nylon film exhibiting excellent dimensional stability and capable of being used as a retort film was obtained.

EXPERIMENTAL EXAMPLES 5 TO 13

Nylon films were obtained from experimental examples with different heating temperatures in the first heating furnace 18 and the second heating furnace 63, and with the presence of the groove 61 on the rolls 61A to 61C. The properties of the nylon film and the other factors were the same as those of the experimental example 4. In the experimental examples 5 to 9, rolls without a groove were used. In the experimental examples 10 to 13, the rolls 61A to 61C with the groove were used. These rolls 61A to 61C with the groove comprise rolls obtained by forming double grooves crossing each other at a pitch of 10 cm on the surface of a metallic roll, and then applying a chrome plating to the surface.

COMPARATIVE EXAMPLE 1

Similarly to the above-described experimental example, polyamide nylon-6 was used and a tubular nylon film was manufactured. Then, this original film was biaxially oriented.

Then, this nylon film was folded to form a flat shape, and the thus-obtained flat nylon film was subjected to a first heat treatment at 150° for 5 seconds in a hot air type heating furnace. Next, this flat nylon film was subjected to a second heat treatment at 190° for 10 seconds in the hot air type heating furnace, without any air interposed between the divided two nylon films.

Then, although it was intended to wind this film by dividing into two pieces, the resulted adhesion prevented this.

COMPARATIVE EXAMPLES 2 TO 6

Nylon films corresponding to each of the comparative examples were obtained by having the heating temperature of the heating furnace and the presence of the air to be interposed varied. The properties of the nylon film and the other factors were the same as those of the comparative example 1. The comparative examples 3, 4, and 6 were performed in such a manner that the film was divided into two pieces, and air was interposed between the two nylon films by using the groove-provided rolls.

In the case of the comparative example 2, no air was interposed between the films similarly to the comparative example 1, and consequently film adhesion occurred. In the comparative examples 3 and 4, although air was interposed between the films, adhesion occurred since the second stage heating temperature was 220° which exceeded the melting point (215° C.) of nylon-6. In the comparative example 5, adhesion occurred in the first stage of heat treatment because the first stage heat treatment temperature was 190° C. which is higher than the temperature (185° C.) that was lower than the melting point by 30° C. In the comparative example 6, the heating treatment temperature in the second stage was 180° C. which was lower than the melting point by 30° C. or more. Therefore, the contraction rate became enlarged.

The treatment conditions corresponding to the experimental examples 4 to 13 and the comparative examples 1 to 6 and the resulted properties of the nylon films obtained by these experimental and comparative examples are collectively shown in Table 1. The properties evaluation was made upon the degree of curl, adhesion, and contraction rate, and final evaluation was made upon each of the examples. Referring to this drawing, as for the degree of curl, mark ○ represents no curl, Δ represents small curl, X represents large curl. The levels superior to the mark Δ represent the levels at which no mechanical problem occurs. The degree of adhesion was a result obtained from observation for 24 hours, in which mark⊙ represents no adhesion, mark ○ represents 1 to 2 portions of adhesion, mark Δ represents 3 to 10, mark X represents excessive adhesion, and mark XX represents adhesion of entire surface. The levels designated by the ○ and Δ are the levels in which the adhered portion can be mechanically separated from each other since the adhesion intensity was small, and the level designated by the mark X is the level in which the mechanical separation cannot be performed. The contraction rate is a result of measurement of the contraction rate in each of 95° C. and 115° C. water. In the final evaluation block, mark⊙ indicates the product can be most suitably manufactured continuously, mark ○ indicates the product can be manufactured continuously without involving any problem, mark Δ indicates the product can be manufactured continuously with slight problems, mark X indicates the product is difficult to continuously manufacture due to serious problems, and mark XX indicates the product is impossible to continuously manufacture.

As can be clearly seen from this table, the nylon films obtained in the experimental examples exhibit satisfactory results upon all of the factors such as degree of curl, degree of adhesion, and contraction rate. Therefore, a nylon film exhibiting excellent dimensional stability can be obtained.

As described above and according to the present invention, a method of and an apparatus for manufacturing biaxial oriented film can be obtained, this method and apparatus exhibiting the following excellent advantages: a film exhibiting an excellent uniform film thickness distribution can be manufactured as a product; the thickness distribution can be automatically adjusted and controlled when the film is manufactured; an oriented film can be manufactured in constant orienting conditions; an excellent working efficiency can be realized at the time of starting the orientation and forming work; extended time operation can be performed; and thermosetting can be applied to the folded film without involving adhesion.

TABLE 1

| | FIRST HEAT TREATMENT | | AIR INTERPOSE | | | SECOND HEAT TREATMENT | |
|---|---|---|---|---|---|---|---|
| | TEMPERATURE (°C.) | TIME (SECOND) | NO AIR | PROVIDED | | TEMPERATURE (°C.) | TIME (SECOND) |
| | | | | ROLL PROVIDED WITH GROOVE | ROLL WITHOUT GROOVE | | |
| E.E. 4 | 60 | 5 | | ○ | | 210 | 10 |
| E.E. 5 | 100 | 5 | | ○ | | 210 | 10 |
| E.E. 6 | 150 | 5 | | ○ | | 210 | 10 |
| E.E. 7 | 180 | 5 | | ○ | | 210 | 10 |
| E.E. 8 | 60 | 5 | | ○ | | 190 | 10 |
| E.E. 9 | 100 | 5 | | ○ | | 190 | 10 |
| E.E. 10 | 60 | 5 | | | ○ | 210 | 10 |
| E.E. 11 | 100 | 5 | | | ○ | 210 | 10 |
| E.E. 12 | 180 | 5 | | | ○ | 210 | 10 |
| E.E. 13 | 60 | 5 | | | ○ | 190 | 10 |
| C.E. 1 | 150 | 5 | ○ | | | 190 | 10 |
| C.E. 2 | 150 | 5 | ○ | | | 210 | 10 |
| C.E. 3 | 150 | 5 | | | ○ | 220 | 10 |
| C.E. 4 | 50 | 5 | | | ○ | 220 | 10 |
| C.E. 5 | 190 | 5 | | | | | |

TABLE 1-continued

| | | | | | | | |
|---|---|---|---|---|---|---|---|
| C.E. 6 | 150 | 5 | | ◯ | | 180 | 10 |

| | | EVALUATION | | | |
|---|---|---|---|---|---|
| | | | | CONTRACTION RATE (%) | |
| | DEGREE OF CURL | DEGREE OF ADHESION | 95° C. | 115° C. | FINAL EVALUATION |
| E.E. 4 | △ | △ | 2 | 4 | △ |
| E.E. 5 | ◯ | ◯ | 2 | 4 | ◯ |
| E.E. 6 | ◯ | ◯ | 2 | 4 | ◯ |
| E.E. 7 | ◯ | ◯ | 2 | 4 | ◯ |
| E.E. 8 | △ | ◯ | 5 | 17 | ◯ |
| E.E. 9 | ◯ | ◯ | 5 | 17 | ◯ |
| E.E. 10 | △ | ⊙ | 2 | 4 | ◯ |
| E.E. 11 | ◯ | ⊙ | 2 | 4 | ⊙ |
| E.E. 12 | ◯ | ⊙ | 2 | 4 | ⊙ |
| E.E. 13 | ◯ | ⊙ | 5 | 17 | ⊙ |
| C.E. 1 | — | X | 5 | 17 | X |
| C.E. 2 | — | XX | 2 | 4 | XX |
| C.E. 3 | ◯ | XX | 1 | 2 | XX |
| C.E. 4 | X | XX | 1 | 2 | XX |
| C.E. 5 | | X | | | X |
| C.E. 6 | ◯ | ◯ | 11 | 20 | X |

E.E. represents experimental example
C.E. represents comparative example

What is claimed is:

1. In a method of manufacturing a biaxially oriented film, including the steps of rapidly cooling molten thermoplastic resin, which has been extruded from an annular extruding die, to form a tubular original film, biaxially orienting said tubular original film by heat supplied from a heating means while conveying said tubular original film between two sets of nip rolls, each nip roll having an individual circumferential speed, and forming said tubular original film, during said conveyance thereof between said nip rolls, into a shape of a bubble by injecting pressurized gas into said tubular original film, the improvement comprising the steps of:
   detecting a thickness distribution of at least one of said original film and said biaxially oriented film;
   detecting a temperature distribution around at least one of said annular extruding die and said heating means, which temperature distribution corresponds to said thickness distribution; changing said temperature distribution based on a relationship between said thickness distribution and said temperature distribution, whereby said thickness distribution of said at least one of said original film and said biaxially oriented film is made uniform.

2. The method of manufacturing a biaxially oriented film according to claim 1, wherein said step of changing said temperature distribution includes division-controlling said temperature distribution.

3. The method of manufacturing a biaxially oriented film according to claim 2, wherein said division-controlling step includes calculating desired heating conditions for division-controlling said temperature distribution around said at least one of said extruding die and said heating means from said measured thickness distribution by using a predetermined formula which compares a desired thickness accuracy of said biaxially oriented film to a thickness accuracy of said biaxially oriented film with said heating conditions arranged to be constant, and performing said division control of said temperature distribution automatically based on said calculation.

4. The method of manufacturing a biaxially oriented film according to claim 1, wherein said biaxially orienting step includes spraying air to a point on an exterior surface of said original film, and an angle defined between a direction in which said air is sprayed and a direction in which said film is conveyed is arranged to be 30 to 60 degrees.

5. In an apparatus for manufacturing a biaxially oriented film, including an annular extruding die and means for obtaining a tubular original film by extruding molten thermoplastic resin from said annular extruding die and thereafter rapidly cooling said resin, means for producing a biaxially oriented film from said tubular original film, including means for applying heat to and injecting pressurized gas into said tubular original film, and two sets of nip rolls for conveying said tubular original film therebetween and between which said heat is applied, the improvement comprising:
   means for enabling a temperature distribution around at least one of said extruding die and said biaxially oriented film to be division-controlled;
   means for detecting a thickness distribution of at least one of said original film and said biaxially oriented film, which thickness distribution corresponds to said temperature distribution;
   temperature distribution detecting means for detecting a value of said temperature distribution around said at least one of said extruding die and said biaxially oriented film; and
   control means for division-controlling said temperature distribution around said at least one of said extruding die and said biaxially oriented film based on a relationship between said detected thickness distribution and said corresponding detected temperature distribution value.

6. The apparatus for manufacturing a biaxially oriented film according to claim 5, wherein said control means includes:
   computing means for computing a proper temperature distribution around said at least one of said extruding die and said biaxially oriented film based on said detected temperature distribution value and said corresponding detected thickness distribution; and
   a temperature adjustment control device capable of division-controlling said temperature distribution around said at least one of said extruding die said biaxially oriented film based on the thus-computed proper temperature distribution.

7. The apparatus for manufacturing a biaxially oriented film according to claim 5, wherein said control means further includes means for storing data on said thickness distribution of said original film and means for storing data on said thickness distribution of said biaxially oriented film.

8. The apparatus for manufacturing a biaxially oriented film according to claim 5 wherein said means for producing said biaxially oriented film includes an air ring capable of spraying air to a point on an exterior surface of said original film and arranged in such a manner that an angle formed by a direction in which said air is sprayed and a direction in which said biaxially oriented film is conveyed is arranged to be 30 to 60 degrees.

9. In a method of manufacturing a biaxially oriented film, including the steps of rapidly cooling molten thermoplastic resin, which has been extruded from an annular extruding die, to form a tubular original film, biaxially orienting said tubular original film by applying heat thereto between two spaced sets of nip rolls and by injecting pressurized gas thereinto, the improvement comprising:

moving one of said sets of nip rolls to elongate a distance between said two sets of nip rolls in response to a detection that said biaxially oriented film has an actual width which is larger than a desired width; and moving one of said sets of nip rolls to shorten the distance between said two sets of nip rolls in response to a detection that said actual width of said biaxially oriented film is smaller than said desired width, whereby an outer diameter of said biaxially oriented film is changed.

10. The method of manufacturing a biaxially oriented film according to claim 9, wherein said steps of adjusting the distance between said two sets of nip rolls are automatically controlled based on said detection of the actual width of said biaxially oriented film.

11. In an apparatus for manufacturing a biaxially oriented film, including an annular extruding die and means for obtaining a tubular original film by extruding molten thermoplastic resin from said annular extruding die and thereafter rapidly cooling said resin, means for producing a biaxially oriented film from said tubular original film, including means for applying heat to and injecting pressurized gas into said tubular original film, and two sets of nip rolls for conveying said tubular original film therebetween and between which said heat is applied, the improvement comprising:

film width detecting means for detecting a width of said biaxially oriented film; and moving means for adjusting a distance between said two sets of nip rolls based on the film width detection performed by said film width detecting means.

12. The apparatus for manufacturing a biaxially oriented film according to claim 11, wherein said moving means includes means for increasing the distance between said two sets of nip rolls if the detected width of said biaxially oriented film is larger than a desired width, and means for decreasing said distance if the detected width of said biaxially oriented film is smaller than said desired width.

13. The apparatus for manufacturing a biaxially oriented film according to claim 11, wherein said moving means includes means for permitting automatic control thereof based on the detection of said film width.

14. The apparatus for manufacturing a biaxially oriented film according to claim 11, wherein said moving means includes brackets for rotatably supporting one set of said nip rolls, and a feed screw mechanism for permitting raising and lowering said brackets.

15. A method of manufacturing a biaxially oriented film, comprising the steps of:

biaxially orienting a tubular original film obtained by rapidly cooling molten thermoplastic resin which has been extruded from an annular extruding die, including applying heat to said tubular original film between two sets of nip rolls and injecting pressurized gas into the inside thereof, and then folding said biaxially oriented film to form a flattened film;

subjecting said flattened film to a first heat treatment at a first heat threatment temperature higher than a temperature at which said flattened film starts its contraction and lower by a predetermined degree than a melting point of said flattened film;

cutting said flattened film and dividing said flattened film into two films;

subjecting said two films to a second heat treatment at a second heat treatment temperature which is lower than said melting point of said two films and higher than a temperature which is lower by a predetermined temperature than said melting point, holding respective side ends of said two films laminated together with air interposed therebetween during said second heat treatment step; and winding said two films after said second heat treatment has been applied thereto.

16. The method of manufacturing a biaxially oriented film according to claim 15, wherein the first heat treatment temperature applied during said first heat treatment process is lower than a temperature which is lower than said melting point of said two films by 30° C.

17. The method of manufacturing a biaxially oriented film according to claim 16, wherein the second heat treatment temperature applied during said second heat treatment process is lower than said melting point of said two films and is higher than a temperature which is lower than said melting point of said two films by 30° C.

18. An apparatus for manufacturing a biaxially oriented film comprising:

an annular extruding die and means for obtaining a tubular original film by extruding molten thermoplastic resin from said annular extruding die and thereafter rapidly cooling said resin, means for producing a biaxially oriented film from said tubular original film, including means for applying heat to and injecting pressurized gas into said tubular original film, two sets of nip rolls for conveying said tubular original film therebetween and between which said heat is applied, means for folding said biaxially oriented film to form a flattened film;

first heat treatment means for applying a first heat treatment to said flattened film;

trimming means for cutting said flatted film to divide said flattened film into two films;

means for laminating said two films with air interposed therebetween;

means for holding respective ends of the two laminated films;

second heat treatment means for applying a second heat treatment to said two films whose respective two ends are held; and means for winding said two films which have been subjected to said second heat treatment applied by said second heat treatment means.

19. The apparatus for manufacturing a biaxially oriented film according to claim 18, wherein said first and second heat treatment means each comprises a hot air furnace.

20. The apparatus for manufacturing a biaxially oriented film according to claim 18, wherein said means for laminating said two films with air interposed therebetween includes a plurality of rolls each having means defining a groove therein.

* * * * *